US009304723B2

(12) United States Patent
Takagi et al.

(10) Patent No.: US 9,304,723 B2
(45) Date of Patent: Apr. 5, 2016

(54) IMAGE FORMING APPARATUS THAT RESTRICTS A STORAGE SIZE OF A GENERATED LOG IMAGE

(71) Applicant: Kyocera Document Solutions Inc., Osaka (JP)

(72) Inventors: Jumpei Takagi, Osaka (JP); Ryota Arinobu, Osaka (JP); Toru Yasui, Osaka (JP); Keiji Okamura, Osaka (JP); Masaki Kikuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/492,230

(22) Filed: Sep. 22, 2014

(65) Prior Publication Data
US 2015/0085318 A1 Mar. 26, 2015

(30) Foreign Application Priority Data

Sep. 24, 2013 (JP) ................................. 2013-197618

(51) Int. Cl.
*G06F 3/12* (2006.01)
(52) U.S. Cl.
CPC .............. *G06F 3/1239* (2013.01); *G06F 3/122* (2013.01); *G06F 3/1273* (2013.01); *G06F 3/1285* (2013.01)
(58) Field of Classification Search
CPC ... G06F 3/1239; G06F 3/1285; G06F 3/1273; G06F 3/122

USPC .................................................. 358/1.15, 1.1
See application file for complete search history.

(56) References Cited

U.S. PATENT DOCUMENTS 5,642,199 A 6/1997 Ukai et al.
2007/0133054 A1* 6/2007 Kobayashi et al. .......... 358/1.16

FOREIGN PATENT DOCUMENTS

| JP | 2007-160675 | 6/2007 |
| JP | 2007-214611 | 8/2007 |
| JP | 2007-300560 | 11/2007 |
| JP | 2008-042782 | 2/2008 |
| JP | 2011-239041 | 11/2011 |

OTHER PUBLICATIONS

Japanese Office Action for Application No. 2013-197618, dated Jan. 5, 2016, 9 pages.

* cited by examiner

*Primary Examiner* — Martin Mushambo
(74) *Attorney, Agent, or Firm* — K&L Gates LLP

(57) ABSTRACT

An image forming apparatus includes: a job executing unit that executes a job based on an image; and a log image generating unit that generates a log image as a history of the image and stores the generated log image in a storage unit. If the job executed by the job executing unit does not involve external output from the image forming apparatus, the log image generating unit restricts a storage size of the log image for this job.

13 Claims, 6 Drawing Sheets

IMAGE FORMING APPARATUS THAT RESTRICTS A STORAGE SIZE OF A GENERATED LOG IMAGE

REFERENCE TO RELATED APPLICATIONS

This application is based upon and claims the benefit of priority from the corresponding Japanese Patent Application No. 2013-197618, filed in the Japan Patent Office on Sep. 24, 2013, the entire contents of which are incorporated herein by reference.

FIELD

The present disclosure relates to an image forming apparatus that generates a log image as the history of the image when executing a job based on an image.

BACKGROUND

Information is prone to being leaked when a copy of confidential information, kept in paper form within a section of a company or some other organization, is brought out.

In order to prevent information disclosure, when executing a job based on an image, a typical image forming apparatus generates a log image as the history of the image, and stores it in a storage unit.

SUMMARY

An image forming apparatus in an embodiment of the present disclosure includes a job executing unit and a log image generating unit. The job executing unit executes a job based on an image. The log image generating unit generates a log image as a history of the image, stores the log image in a storage unit. If the job executed by the job executing unit does not involve external output from the image forming apparatus, the log image generating unit restricts the storage size of the log image for this job.

An image forming method in an embodiment of the present disclosure includes: (i) executing, via a job executing unit, a job based on an image; (ii) generating, via the log image generating unit, a log image as a history of the image; (iii) storing, via the log image generating unit, the log image in a storage unit; and (iv) if the job executed by the job executing unit does not involve external output from an image forming apparatus, restricting, via a log image generating unit, the storage size of the log image for the job.

A non-transitory computer readable recording medium in an embodiment of the present disclosure stores an image forming program executable by a computer. The image forming program includes first to fourth program codes. The first program code causes the computer to execute a job based on an image. The second program code causes the computer to generate a log image as a history of the image. The third program code causes the computer to store the log image in the storage unit. The fourth program code causes the computer to restrict, if the job executed by the first program code does not involve external output from the image forming apparatus, the storage size of the log image for the job.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure will be described below with reference to the accompanying drawings.

First, a configuration of an image forming system 10 in an embodiment will be described.

Figure 1:
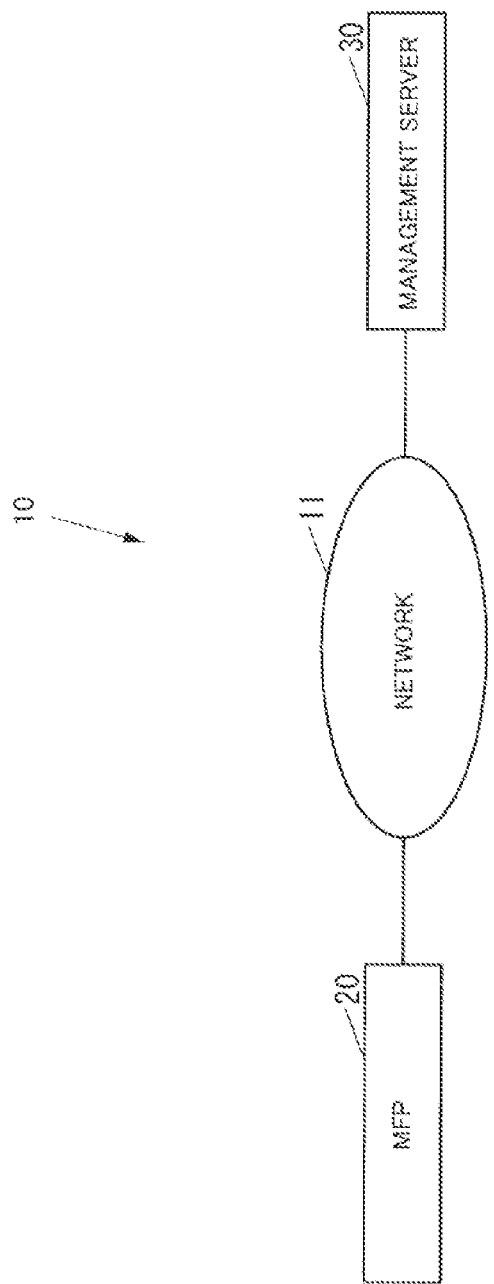
FIG. 1 illustrates a configuration of an image forming system in an embodiment of the present disclosure.

FIG. 1 illustrates a configuration of the image forming system 10.

As illustrated in FIG. 1, the image forming system 10 includes: a multifunction peripheral (MFP) 20 that acts as an image forming apparatus; and a management server 30 formed of a computer that controls the MFP 20. The MFP 20 and the management server 30 are interconnected by a network 11, such as a LAN (Local Area Network) or the Internet, so that they can communicate with each other.

Figure 2:
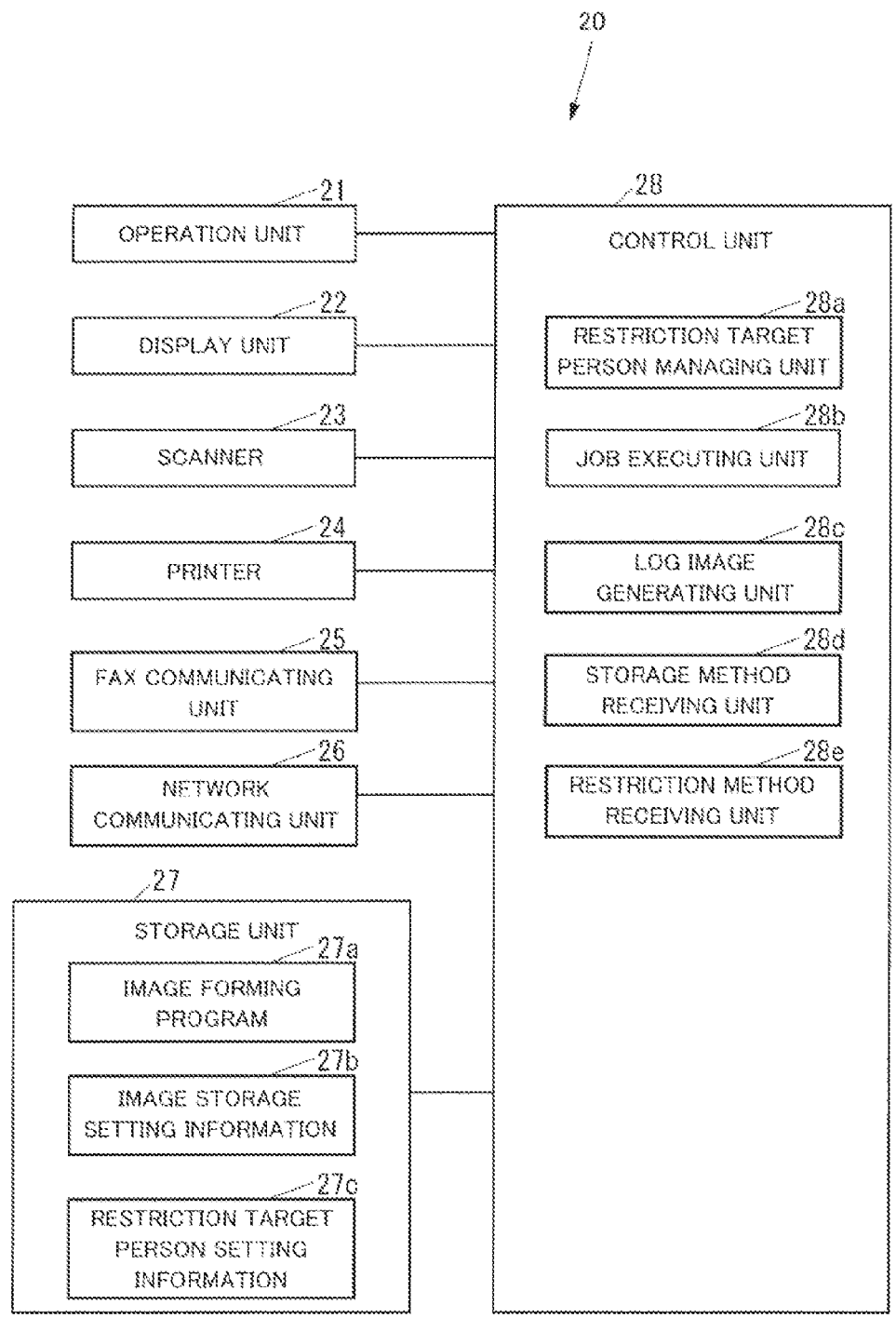
FIG. 2 illustrates a configuration of the MFP in the embodiment of the present disclosure.

FIG. 2 illustrates a configuration of the MFP 20.

As illustrated in FIG. 2, the MFP 20 includes an operation unit 21, a display unit 22, a scanner 23, a printer 24, a fax communicating unit 25, a network communicating unit 26, a storage unit 27, and a control unit 28. The operation unit 21 is an input device with a button by which a user enters various operations. The display unit 22 is a device, for example, with an LCD (Liquid Crystal Display) on which various pieces of information appear. The scanner 23 is a device that reads images from originals. The printer 24 is a device that prints data on recording media such as sheets of paper. The fax communicating unit 25 is a device that communicates with an external facsimile machine via a communication line such as a public telephone line. The network communicating unit 26 is a device that communicates with an external device via the network 11 (see FIG. 1). The storage unit 27 is a nonvolatile device, such as an EEPROM (Electrically Erasable Programmable Read Only Memory) or an HDD (Hard Disk Drive), that stores various pieces of data. The control unit 28 is a computer that controls the whole of the MFP 20. For a job based on an image, the MFP 20 can generate a log image as the history of this image.

Both the operation unit 21 and the display unit 22 may form an input device with a touch panel.

The storage unit 27 stores an image forming program 27a to be executed by the MFP 20. The image forming program 27a may be installed in the MFP 20 during its fabrication. Alternatively, it may be installed through the network 11 or a recording medium, such as an SD card or a USB (Universal Serial Bus) memory, as an additional process.

The storage unit 27 can further store log image storage setting information 27b indicating whether to restrict the storage sizes of log images for jobs that do not involve external output from the MFP 20. It should be noted that these jobs are referred to below as "intra-MFP complete jobs."

Exemplary intra-MFP complete jobs include: a job "scan to box" used to read an image from an original through the scanner 23 and store it in a specific region "box" within the storage unit 27; a job used to receive an image through the fax communicating unit 25 and store it in the "box;" a job used to receive an image through the network communicating unit 26 and store it in the "box;" and a job used to acquire an image from an external storage medium, such as a USB memory, and store it in the "box."

However, for example, a job used to send an image through the fax communicating unit 25 or the network communicating unit 26 or a job used to store an image in an external storage medium, such as a USB memory, is not regarded as an intra-MFP complete job, because these jobs involve outputting an image from the MFP 20 as electric data.

Likewise, a job used to receive an image through the fax communicating unit 25 or the network communicating unit 26 and print it with the printer 24, a job used to acquire an image from an external storage medium, such as a USB memory, and print it with the printer 24, or a job "copy" used to read an image from an original with the scanner 23 and print it with the printer 24 is not also regarded as an intra-MFP complete job, because these jobs involve outputting an image from the MFP 20 as a printed matter.

The storage unit 27 can further store restriction target person setting information 27c indicating target persons for which the storage size of a log image is to be restricted. It should be noted that these persons are referred to below as "restriction target persons." The restriction target persons may be determined individually based on user IDs or collectively based on the group to which users belong.

Exemplary components of the control unit 28 are a CPU (Central Processing Unit), a ROM (Read Only Memory) that stores programs and various pieces of data, and a RAM (Random Access Memory) used as a work area for the CPU. The CPU executes programs stored in the ROM and the storage unit 27.

The control unit 28 functions as: a restriction target person managing unit 28a that manages restriction target persons by executing the image forming program 27a stored in the storage unit 27; a job executing unit 28b that executes jobs; a log image generating unit 28c that generates log images and stores them in the management server 30; a storage method receiving unit 28d that receives a method of storing log images; and a restriction method receiving unit 28e that receives a method of restricting the storage sizes of log images.

Figure 3:
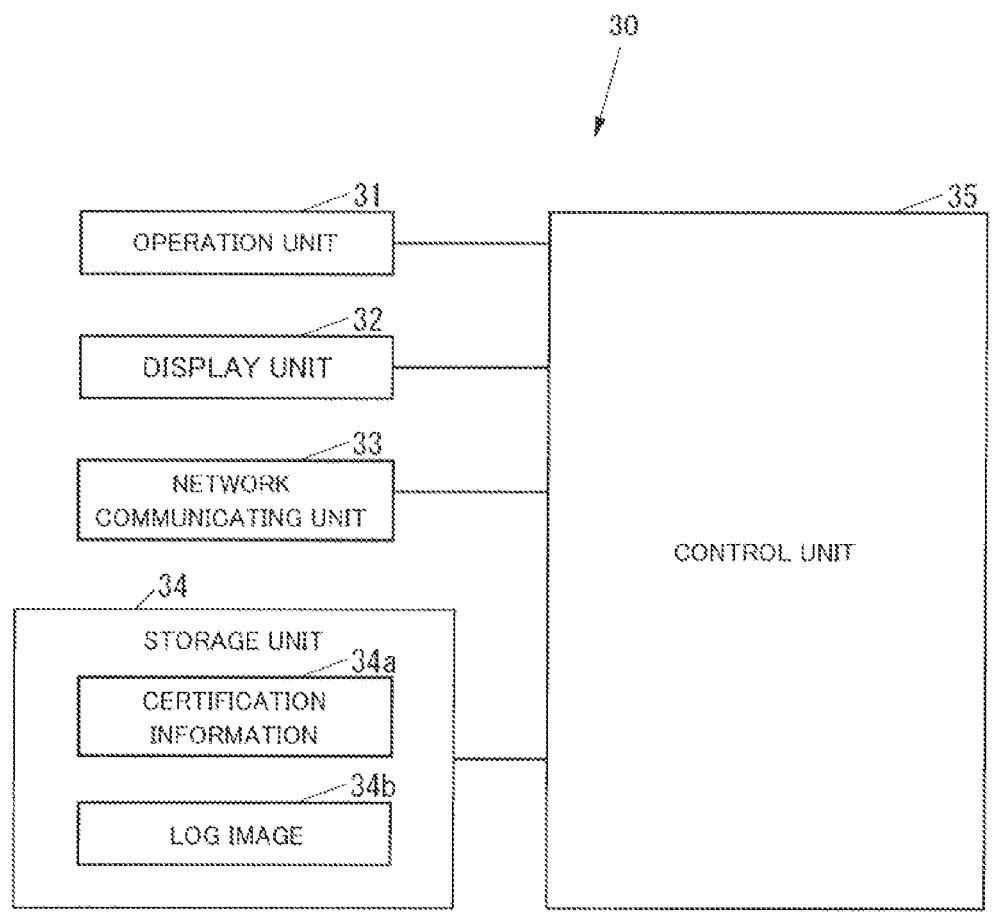
FIG. 3 illustrates a configuration of the management server in an embodiment of the present disclosure.

FIG. 3 illustrates a configuration of the management server 30.

As illustrated in FIG. 3, the management server 30 includes an operation unit 31, a display unit 32, a network communicating unit 33, a storage unit 34, and a control unit 35. The operation unit 31 is an input device, such as a mouse or a keyboard, through which a user enters various operations. The display unit 32 is a device, for example, with an LCD on which various pieces of information appear. The network communicating unit 33 is a device that communicates with an external device via a network 11 (see FIG. 1). The storage unit 34 is a nonvolatile device, such as an HDD, that stores programs and various pieces of data. The control unit 35 is a computer that controls the whole of the management server 30. The management server 30 may be formed of a computer such as a PC (Personal Computer).

The storage unit 34 can store certification information 34a containing user IDs and passwords and log images 34b as the histories of images. The certification information 34a and the log images 34b are stored in relation to respective user IDs. Alternatively, the log images 34b can be stored in relation to respective jobs.

Exemplary components of the control unit 35 are a CPU, a ROM that stores programs and various pieces of data, and a RAM used as a work area for the CPU. The CPU executes programs stored in the ROM and the storage unit 34.

Next, an operation of the image forming system 10 will be described.

First, an operation of the MFP 20 will be described when the log image storage setting information 27b is set.

An administrator of the MFP 20 can give an instruction for setting the log image storage setting information 27b to the MFP 20 via the operation unit 21.

When the control unit 28 in the MFP 20 receives the instruction for setting the log image storage setting information 27b, it stores the log image storage setting information 27b in the storage unit 27 based on this instruction.

Next, an operation of the MFP 20 will be described when the restriction target person setting information 27c is set.

An administrator of the MFP 20 can give an instruction for setting the restriction target person setting information 27c to the MFP 20 via the operation unit 21.

When the restriction target person managing unit 28a in the control unit 28 of the MFP 20 receives the instruction for setting the restriction target person setting information 27c, it stores the restriction target person setting information 27c in the storage unit 27 based on this instruction.

An operation of the MFP 20 will be described when a user logs in to the MFP 20.

When the control unit 28 in the MFP 20 receives certification information from the operation unit 21, it forwards this certification information to the management server 30 via the network communicating unit 26.

When the control unit 35 in the management server 30 receives the certification information transmitted from the MFP 20 via the network communicating unit 33, it determines whether or not this certification information is identical to the certification information 34a stored in the storage unit 34. If the control unit 35 determines that the certification information transmitted from the MFP 20 is identical to the stored certification information 34a, it transmits login permission information to the MFP 20 via the network communicating unit 33, indicating that the user is permitted to log in. If the control unit 35 determines that the certification information transmitted from the MFP 20 is not identical to the stored certification information 34a, it transmits login prohibition information to the MFP 20 via the network communicating unit 33, indicating that the user is prohibited from logging in.

If the control unit 28 in the MFP 20 receives the login permission information transmitted from the management server 30 via the network communicating unit 26, it permits a user to log in. If the control unit 28 receives the login prohibition information transmitted from the management server 30 via the network communicating unit 26, it does not permit a user to log in.

An operation of the MFP 20 that is described below is performed while a user logs in to the MFP 20.

Next, an operation of the MFP 20 that is performed along with the execution of a job will be described.

A user of the MFP 20 can give an instruction for executing a job based on a target image to the MFP 20 via the operation unit 21. Alternatively, a user of the MFP 20 can give an instruction for executing a job based on a target image to the MFP 20 from a device external to the MFP 20 via the network communicating unit 26.

Figure 4:
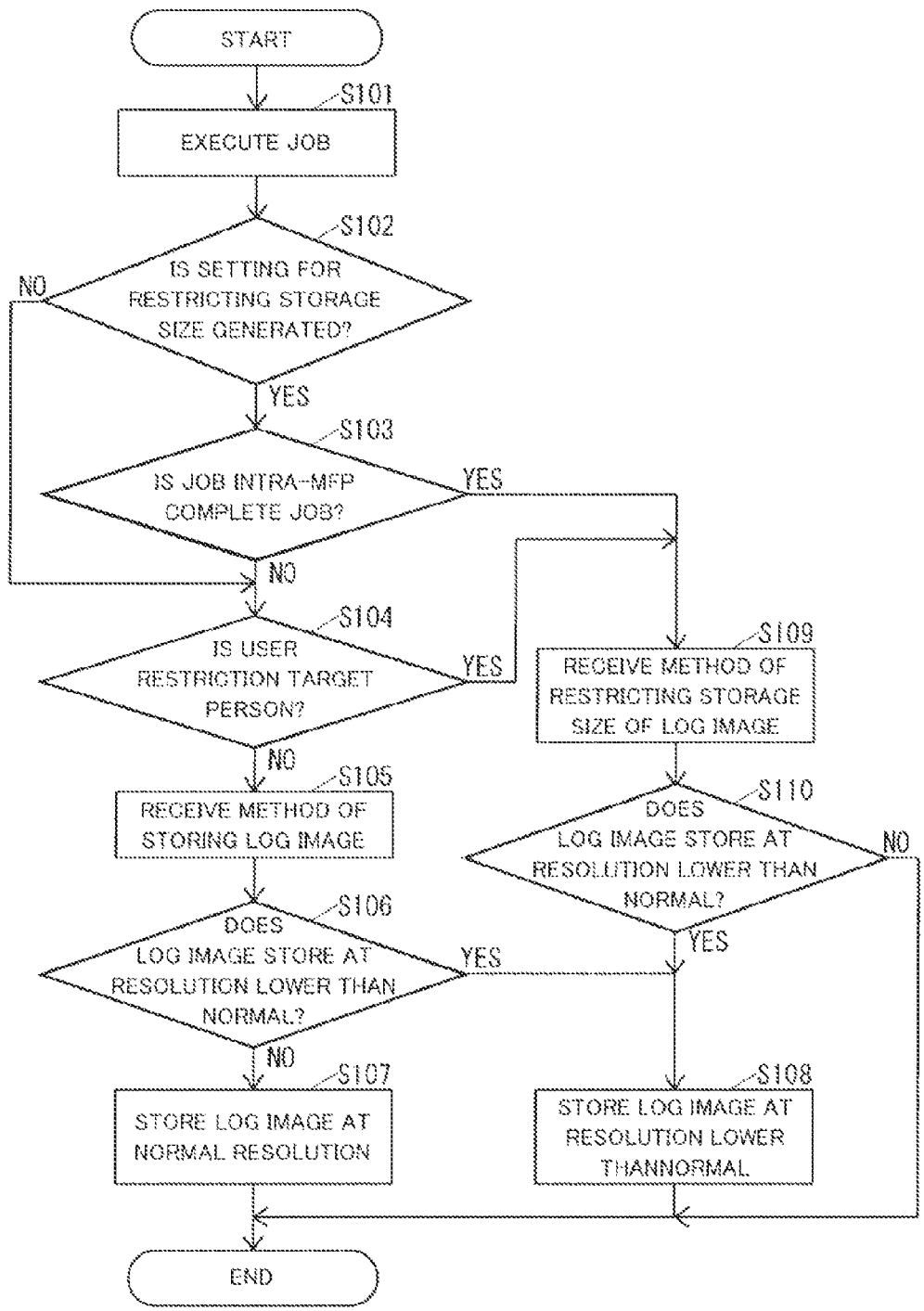
FIG. 4 shows operation steps of the MFP when the MFP executes a job based on a target image.

If the control unit 28 in the MFP 20 is given the instruction for executing the job based on the target image, it performs an operation shown in FIG. 4.

FIG. 4 shows operation steps that are performed along with the execution of a job based on a target image.

As shown in FIG. 4, the job executing unit 28b in the control unit 28 executes the job based on the target image (S101).

Then, the log image generating unit 28c determines whether or not a setting for restricting the storage size of a log image for an intra-MFP complete job has been generated, based on the log image storage setting information 27b (S102).

If determining that a setting for restricting the storage size of a log image for an intra-MFP complete job has been generated at S102, the log image generating unit 28c determines whether or not the job executed at S101 is an intra-MFP complete job (S103).

If determining that a setting for restricting the storage size of a log image for an intra-MFP complete job has been generated at S102 or the job executed at S101 is not an intra-MFP complete job at S103, the log image generating unit 28c determines whether or not a user who logs in is a restriction target person, based on the restriction target person setting information 27c (S104).

Figure 5:
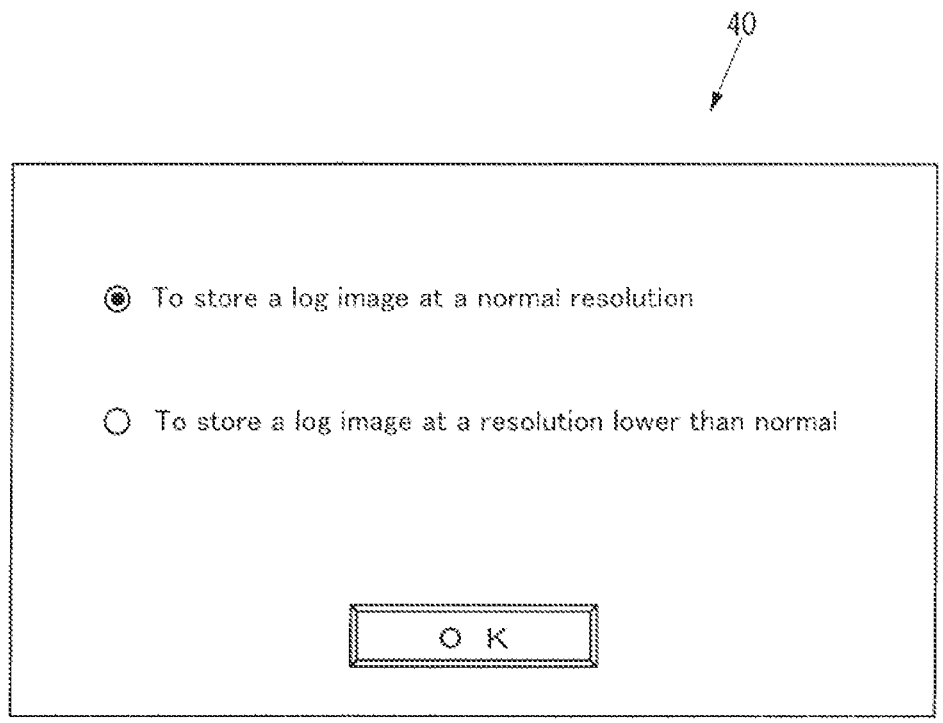
FIG. 5 illustrates an exemplary storage method selecting screen that appears in the display unit of the MFP in an embodiment of the present disclosure.

If it is determined that the user is not a restriction target person at S104, the storage method receiving unit 28d displays a storage method selecting screen 40, as illustrated in FIG. 5, in the display unit 22, and then receives a method of storing the log image from the operation unit 21 (S105). Here, the storage method selecting screen 40 prompts the user to select one of methods of storing the log image at a normal resolution and at a resolution lower than normal. Specifically, if the execution of the job at S101 is directed by an external device via the network communicating unit 26, the storage method receiving unit 28d displays the storage method selecting screen 40 in the display unit of the external device via the network communicating unit 26. Then, it receives a method of storing the log image from the external device via the network communicating unit 26.

The log image generating unit 28c determines whether or not the storage method receiving unit 28d has received a method of storing the log image at a resolution lower than normal at S105 (S106).

If the log image generating unit 28c determines that the storage method receiving unit 28d has not received a method of storing the log image at a resolution lower than normal at S106, it generates the log image for the target image associated with the job executed at S101 at a normal resolution. After that, the log image generating unit 28c stores the generated log image in the management server 30 via the network communicating unit 26, as the log image 34b related to the ID of the user who logs in (S107), and then terminates the operation shown in FIG. 4.

If the log image generating unit 28c determines that the storage method receiving unit 28d has received a method of storing the log image at a resolution lower than normal at S106, it generates the log image for the target image associated with the job executed at S101 at a resolution lower than normal. After that, the log image generating unit 28c stores the generated log image in the management server 30 via the network communicating unit 26, as the log image 34b related to the ID of the user who logs in (S108), and then terminates the operation shown in FIG. 4.

Figure 6:
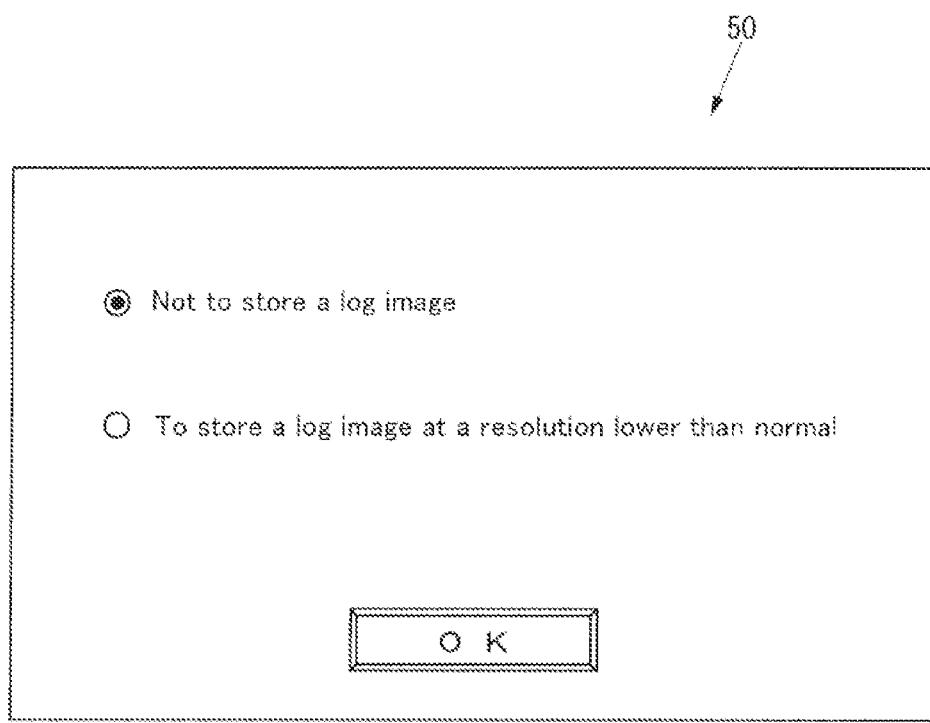
FIG. 6 illustrates an exemplary storage size restriction method selecting screen that appears in the display unit of the MFP in an embodiment of the present disclosure.

If the log image generating unit 28c determines that the job executed in S101 is an intra-MFP complete job at S103 or the user is a restriction target person at S104, the restriction method receiving unit 28e displays a storage size restriction method selecting screen 50, as illustrated in FIG. 6, in the display unit 22. Then the restriction method receiving unit 28e receives a method of restricting the storage size of the log image from the operation unit 21 (S109). Here, the storage size restriction method selecting screen 50 prompts the user to select one of a method of not storing the log image and a method of storing it at a resolution lower than normal (S109). Specifically, if the execution of the job at S101 is directed by an external device via the network communicating unit 26, the restriction method receiving unit 28e displays the storage size restriction method selecting screen 50 in the display unit of the external device via the network communicating unit 26. Then, it receives a method of restricting the storage size of the log image from the external device via the network communicating unit 26.

Then, the log image generating unit 28c determines whether or not the restriction method receiving unit 28e has received a method of storing the log image at a resolution lower than normal at S109 (S110).

If the log image generating unit 28c determines that the restriction method receiving unit 28e has not received a method of storing the log image at a resolution lower than normal at S110, it terminates the operation shown in FIG. 4 without storing the log image for the target image associated with the job executed in S101.

If the log image generating unit 28c determines that the restriction method receiving unit 28e has received a method of storing the log image at a resolution lower than normal at S110, it generates the log image for the target image associated with the job executed at S101 at a resolution lower than normal. After that, the log image generating unit 28c stores the generated log image in the management server 30 via the network communicating unit 26, as the log image 34b related to the ID of the user who logs in (S108), and then terminates the operation shown in FIG. 4.

As described above, if an executed job does not involve external output from the MFP 20 (YES at S103), the image forming system 10 restricts the storage size of the log image for this job (S108 or NO at S110). In general, jobs that do not involve external output from the MFP 20, such as a job used to store an image in a "box" within the storage unit 27, are much less prone to cause information disclosure than those involving external output. For this reason, the image forming system 10 restricts the storage sizes of the log images for jobs that do not involve external output from the MFP 20, making it possible to increase the usable storage capacity of the storage unit 27. On the other hand, the image forming system 10 does not restrict the storage sizes of the log images for jobs that involve external output from the MFP 20, making it possible to maintain easy identification of an image upon the occurrence of information disclosure.

In restricting the storage size of a log image, the image forming system 10 enables a user to designate (S109) whether the log image will not be stored (NO at S110) or will be stored at a resolution lower than normal (YES at S110 and S108). In this way, the image forming system 10 can restrict the storage sizes of log images by using a method satisfying a user's requirement.

When determining to store a log image, the image forming system 10 enables a user to designate (S105) whether the log image will be stored at a normal resolution (S107) or at a resolution lower than normal (S108). In this way, the image forming system 10 can restrict the storage sizes of log images, based on a user's requirement.

The image forming system 10 restricts the storage size of a log image for a specific user (YES at S104). In this way, the image forming system 10 can reduce the storage sizes of log images in comparison with a configuration in which the storage sizes are independent of a user's requirement.

In an embodiment, the image forming system 10 receives a method of restricting the storage size of the log image every time a job is executed (S109); however it may receive a method in advance, based on a setting applied commonly to a plurality of jobs.

Likewise, the image forming system 10 in an embodiment receives a method of storing the log image every time a job is executed (S105); however it may receive a method in advance, based on a setting applied commonly to a plurality of jobs.

In an embodiment, in restricting the storage size of a log image, the image forming system 10 enables a user to designate (S109) whether the log image will not be stored (NO at S110) or will be stored at a resolution lower than normal (YES at S110). However, the image forming system 10 may employ only one of these methods, and therefore may not accept a user's designation.

In an embodiment, the image forming system 10 enables a user to designate (S105) whether log images will be stored at a normal resolution (S107) or at a resolution lower than normal (S108). However, the image forming system 10 may employ only the method of storing log images at a normal resolution, and therefore may not accept a user's designation.

In an embodiment, in the image forming system 10, the MFP 20 performs the processing shown in FIG. 4; however the management server 30 may perform a part or whole of the steps shown in FIG. 4 aside from the step at S101.

In an embodiment, in the image forming system 10, the MFP 20 stores the log image storage setting information 27*b* and the restriction target person setting information 27*c* in the storage unit 27; however the management server 30 may store one or both of these pieces of information in the storage unit 34.

In an embodiment, in the image forming system 10, the management server 30 stores the certification information 34*a* and the log images 34*b* in the storage unit 34; however the MFP 20 may store some or all of these in the storage unit 27.

By storing all of certification information and log images in the storage unit 27 of the MFP 20, the management server 30 may be eliminated.

As described above, since the image forming system 10 can restrict the storage size required for log images, even if the storage unit 27 in the MFP 20 has a limited capacity, for example, due to the lack of a HDD, the MFP 20 can serve the purpose of storing log images.

In an embodiment, the image forming system 10 is equipped with an MFP as an exemplary image forming device; however it may be equipped with an MFP as well as image forming devices such as a dedicated printer machine, a dedicated copy machine, and a dedicated facsimile machine.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image forming apparatus comprising:
a memory that stores a program; and
a processor, wherein when the processor executes the program, the processor operates as:
a job executing unit that executes a job based on an image; and
a log image generating unit that generates a log image as a history of the image, and stores the log image in a storage unit, wherein
the log image generating unit restricts a storage size of the log image for the job if the job executed by the job executing unit does not involve external output from the image forming apparatus, and
the log image generating unit avoids restricting the storage size of the log image for the job if the job executed by the job executing unit involves external output from the image forming apparatus.

2. The image forming apparatus according to claim 1, wherein
when the processor executes the program, the processor further operates as a restriction method receiving unit that receives a restriction method of the storage size,
the log image generating unit restricts the storage size by using the restriction method received by the restriction method receiving unit if the job executed by the job executing unit does not involve external output from the image forming apparatus,
the restricting method includes a method of not storing the log image and a method of storing a first log image at a first resolution lower than a second resolution by which the storage size is not restricted,
the log image generating unit generates the first log image for the job at the first resolution, when storing the first log image if the job executed by the job executing unit does not involve external output from the image forming apparatus, and
the log image generating unit generates a second log image for the job at the second resolution if the job executed by the job executing unit involves external output from the image forming apparatus.

3. The image forming apparatus according to claim 1, wherein
when the processor executes the program, the processor operates as a storage method receiving unit that receives a storage method of the log image,
the log image generating unit stores the log image in the storage unit by using the storage method received by the storage method receiving unit,
the storage method includes a method of storing a first log image at a first resolution lower than a second resolution by which the storage size is not restricted and a method of storing a second log image at the second resolution,
the log image generating unit generates the first log image for the job at the first resolution if the job executed by the job executing unit does not involve external output from the image forming apparatus, and the log image generating unit generates the second log image for the job at the second resolution if the job executed by the job executing unit involves external output from the image forming apparatus.

4. The image forming apparatus according to claim 1, wherein
when the processor executes the program, the processor operates as a restriction target person managing unit that manages a target person for which the storage size is to be restricted, and
the log image generating unit restricts the storage size for the restriction target person managed by the restriction target person managing unit.

5. The image forming apparatus according to claim 1, wherein
the job that does not involve external output from the image forming apparatus includes an internal storage job that stores an obtained image in a specific region within the image forming apparatus, and
the job that involves external output from the image forming apparatus includes at least one of a sending job that sends the obtained image from the image forming apparatus, an external storage job that stores the obtained image in an external storage media, a print job, and a copy job.

6. An image forming method comprising:
executing, via a job executing unit, a job based on an image;
generating, via a log image generating unit, a log image as a history of the image;
storing, via the log image generating unit, the log image in a storage unit;
if the job executed by the job executing unit does not involve external output from an image forming apparatus, restricting, via the log image generating unit, a storage size of the log image for the job; and
if the job executed by the job executing unit involves external output from the image forming apparatus, avoiding, via the log image generating unit, restricting the storage size of the log image for the job.

7. The image forming method according to claim 6, comprising:
receiving, via a restriction method receiving unit, a restriction method of the storage size;
if the job executed by the job executing unit does not involve external output from the image forming apparatus,
restricting, via the log image generating unit, the storage size by using the restriction method received by the restriction method receiving unit, wherein the restricting method includes a method of not storing the log image and a method of storing a first log image at a first resolution lower than a second resolution by which the storage size is not restricted, and
generating, via the log image generating unit, the first log image for the job at the first resolution when storing the first log image; and
if the job executed by the job executing unit involves external output from the image forming apparatus, generating, via the log image generating unit, a second log image for the job at the second resolution.

8. The image forming method according to claim 6, comprising:
receiving, via a storage method receiving unit, a storage method of the log image;
storing, via the log image generating unit, the log image in the storage unit by using the storage method received by the storage method receiving unit, wherein the storage method includes a method of storing a first log image at a first resolution lower than a second resolution by which the storage size is not restricted and a method of storing a second log image at the second resolution;
if the job executed by the job executing unit does not involve external output from the image forming apparatus, generating, via the log image generating unit, the first log image for the job at the first resolution; and
if the job executed by the job executing unit involves external output from the image forming apparatus, generating, via the log image generating unit, the second log image for the job at the second resolution.

9. The image forming method according to claim 6, comprising:
managing, via a restriction target person managing unit, a target person for which the storage size is to be restricted; and
restricting, via the log image generating unit, the storage size for the restriction target person managed by the restriction target person managing unit.

10. A non-transitory computer readable recording medium that stores an image forming program executable by a computer, the image forming program comprising:
a first program code that causes the computer to execute a job based on an image;
a second program code that causes the computer to generate a log image as a history of the image;
a third program code causing the computer to store the log image in a storage unit;
a fourth program code that causes the computer to restrict, if the job executed by the first program code does not involve external output from an image forming apparatus, a storage size of the log image for the job; and
a fifth program code that causes the computer to avoid restricting the storage size of the log image for the job if the job executed by the first program code involves external output from the image forming apparatus.

11. The non-transitory computer readable recording medium according to claim 10, the image forming program comprising:
a sixth program code that causes the computer to receive a restriction method of the storage size, wherein
the fourth program code causes the computer to restrict the storage size by using the restriction method received by a storage method receiving unit if the job executed by the first program code does not involve external output from the image forming apparatus,
the restriction method includes a method of not storing the log image and a method of storing a first log image at a first resolution lower than a second resolution by which the storage size is not restricted;
the second program code causes the computer to generate the first log image for the job at the first resolution, when storing the first log image if the job executed by the first program code does not involve external output from the image forming apparatus; and
the second program code causes the computer to generate a second log image for the job at the second resolution if the job executed by the first program code involves external output from the image forming apparatus.

12. The non-transitory computer readable recording medium according to claim 10, the image forming program further comprising:
a seventh program code that causes the computer to receive a storage method of the log image, wherein the third program code causes the computer to store the log image in the storage unit by using the storage method received by the seventh program code, the storage method includes a method of storing the log image at a first resolution lower than a second resolution by which the storage size is not restricted and a method of storing a first log image at the second resolution, the second program code causes the computer to generate the first log image for the job at the first resolution if the job executed by the first program code does not involve external output from the image forming apparatus, and the second program code causes the computer to generate a second log image for the job at the second resolution if the job executed by the first program code involves external output from the image forming apparatus.

13. The non-transitory computer readable recording medium according to claim 10, the image forming program further comprising:

an eighth program code that causes the computer to manage a target person for which the storage size is to be restricted; and the fourth program code causes the computer to restrict the storage size for the target person managed by the eighth program code.

* * * * *